US012719698B2

(12) United States Patent
Muhia et al.

(10) Patent No.: US 12,719,698 B2
(45) Date of Patent: Aug. 25, 2026

(54) METHOD AND SYSTEM FOR BLOCKCHAIN-BASED COOPERATIVE SOCIETY TRANSACTIONS

(71) Applicant: Mastercard International Incorporated, Purchase, NY (US)

(72) Inventors: Ephraim Kimani Muhia, Kakuru (KE); Zachariah Njoroge, Nairobi (KE)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 18/882,993

(22) Filed: Sep. 12, 2024

(65) Prior Publication Data

US 2025/0007729 A1 Jan. 2, 2025

Related U.S. Application Data

(63) Continuation of application No. 17/957,667, filed on Sep. 30, 2022, now abandoned.

(30) Foreign Application Priority Data

Oct. 1, 2021 (AP) ..................... AP/P/2021/013527

(51) Int. Cl.
*H04L 29/06* (2006.01)
*H04L 9/00* (2022.01)
(Continued)

(52) U.S. Cl.
CPC .......... *H04L 9/3247* (2013.01); *H04L 9/3073* (2013.01); *H04L 9/50* (2022.05)

(58) Field of Classification Search
CPC ........ H04L 9/3247; H04L 9/50; H04L 9/3073
See application file for complete search history.

(56) References Cited

U.S. PATENT DOCUMENTS 10,652,019 B1 5/2020 Nicolas et al.
10,936,552 B2 3/2021 Androulaki et al.
(Continued)

FOREIGN PATENT DOCUMENTS

CN 110300167 A 6/2019
CN 112968881 A 6/2021
(Continued)

OTHER PUBLICATIONS

Decision to Refuse issued Aug. 19, 2025 in Japanese Application No. 2024-519829.

(Continued)

*Primary Examiner* — Evans Desrosiers
(74) *Attorney, Agent, or Firm* — Panitch Schwarze Belisario & Nadel LLP

(57) ABSTRACT

A method for implementing a cooperative society through a blockchain with participation via computing devices includes: storing, in a blockchain node, a blockchain comprised of a plurality of blocks, each block including a block header and one or more blockchain data values, where at least one of the blockchain data values includes proposal data including at least a proposal identifier; receiving a vote message from each of a plurality of registered computing devices including the proposal identifier and an affirmative or negative vote; determining a proposal result based on a number of affirmative votes being above a predetermined threshold; generating a new block including a new block header and at least one new blockchain data value, the at least one new blockchain data value including the proposal result; and performing one or more actions based on data included in the proposal data.

19 Claims, 5 Drawing Sheets

(51) Int. Cl.

| | |
|---|---|
| ***H04L 9/30*** | (2006.01) |
| ***H04L 9/32*** | (2006.01) |

(56) References Cited

U.S. PATENT DOCUMENTS

| | | | |
|---|---|---|---|
| 2017/0004029 | A1 | 1/2017 | Endo |
| 2017/0109955 | A1 | 4/2017 | Ernest et al. |
| 2019/0051079 | A1 | 2/2019 | Venkataraman et al. |
| 2019/0253239 | A1 | 8/2019 | Shao et al. |
| 2020/0082126 | A1* | 3/2020 | Brown ................. G06Q 20/401 |
| 2020/0118096 | A1 | 4/2020 | Yang et al. |
| 2020/0258338 | A1 | 8/2020 | Goswami et al. |
| 2020/0389321 | A1 | 12/2020 | Fletcher et al. |
| 2022/0114583 | A1* | 4/2022 | Nie .................... G06Q 20/4016 |
| 2022/0245722 | A1 | 8/2022 | Enkhtaivan |
| 2022/0247573 | A1 | 8/2022 | Li et al. |
| 2022/0337429 | A1 | 10/2022 | Qiu et al. |
| 2024/0265347 | A1* | 8/2024 | Matchett .............. G06Q 10/103 |

FOREIGN PATENT DOCUMENTS

| | | | |
|---|---|---|---|
| EP | 3518188 | A1 | 7/2019 |
| JP | 4630144 | B2 | 2/2011 |
| JP | 2020501402 | A | 1/2020 |
| WO | 2015140942 | A1 | 9/2015 |
| WO | 2020130717 | A1 | 6/2020 |
| WO | 2020261359 | A1 | 12/2020 |
| WO | 2022186960 | A1 | 9/2022 |

OTHER PUBLICATIONS

Search Report issued on Nov. 5, 2024, by the African Regional Intellectual Property Organization, 4 pages.

Notice of Reasons for Refusal dated May 7, 2025 in corresponding Japanese Patent Application No. 2024-519829 with English Translation (9 pages).

Examination Report dated May 15, 2025 in corresponding African Patent Application No. AP/P/2021/013527, 3 pages.

Notification of Transmittal of the International Search Report and the Written Opinion of the International Searching Authority, or the Declaration dated Nov. 28, 2022 in International Application No. PCT/US2022/041842, 15 pps.

Robinson, Peter, "Consensus for Crosschain Communications", Protocol Engineering Group and Systems (PegaSys), ConsenSys, School of Information Technology and Electrical Engineering, University of Queensland, Australia, Apr. 18, 2020, 15 pps.

Santini, Francesco, et al, "End-to-End Voting with Non-Permissioned and Permissioned Ledgers", Journal of Grid Computing 17 pp. 97-118 (Mar. 20, 2019).

Stefano Bistarelli et al, "An end-to-end voting-system based on bitcoin", Conference Paper, Apr. 2017, 7 pps.

Sliusar, Valentin et al, "Blockchain Technology Application for Electronic Voting Systems", 2021 IEEE Conference of Russian Young Researchers in Electrical and Electronic Engineering (ELCONRUS), IEEE, Jan. 26, 2021 (Jan. 26, 2021), pp. 2257-2261, XP033897058, DOI: 10.1109/ELCONRUS51938.2021.9396400 [retrieved on Apr. 5, 2021] the whole document 1-16.

Written Opinion dated Mar. 3, 2026, issued in corresponding Singapore Patent Application No. 11202401205T, 10 pages.

Examination Report dated Jun. 10, 2026, issued in corresponding European Patent Application No. 22777421.3 (7 pages).

* cited by examiner

METHOD AND SYSTEM FOR BLOCKCHAIN-BASED COOPERATIVE SOCIETY TRANSACTIONS

CLAIM FOR PRIORITY

This application claims benefit of the following patent applications, all of which are hereby incorporated by reference herein: (1) ARIPO Patent Application No. AP/P/2021/013527, filed Oct. 1, 2021, by Ephraim Kimani Muhia and Zachariah Njoroge; and (2) PCT Application No. PCT/US2022/041842, filed Aug. 29, 2022, by Ephraim Kimani Muhia and Zachariah Njoroge.

FIELD

The present disclosure relates to the use of blockchains for cooperative society transactions; specifically through a blockchain that utilizes computing devices and protocols for facilitating cooperative society transactions.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. One of the more popular aspects of a blockchain is that it is an immutable record: every transaction ever that is part of the chain is stored therein and cannot be changed due to the computational requirements and bandwidth limitations, particularly as a chain gets longer and a blockchain network adds more nodes.

Informal cooperative societies or pooled resource groups are used throughout Eastern Africa to pool and invest savings and other assets for a group of members. Informal cooperative societies are beneficial in helping members perform large transactions and other actions that would be difficult to do as individuals and can sometimes operate similar to other cooperative groups. In many instances, an informal cooperative society may be so informal as to not have any official documentation while maintaining a pool of millions of dollars. However, this lack of documentation can result in a number of problems, such as due to embezzlement, mismanagement of funds, collusion, member disagreements, and other problems. Additionally, informal cooperative societies often rely on physical meetings between members for collection of funds, submission of new proposals, votes on proposals, how to use funds, and other actions. Such meetings can be time consuming, particularly over large distances, and may itself be a drain on resources for the informal cooperative society. These difficulties, combined with a system that has largely ignored thorough recordkeeping, has resulted in cooperatives that, while effective, can be vastly inefficient and difficult for members.

Thus, there is a need for improvement in the informal cooperative society system, which can be accomplished through the use of blockchains.

SUMMARY

The present disclosure provides a description of systems and methods for implementing a cooperative society through a blockchain with participation via computing devices. A blockchain is established for a cooperative society, which is used as an immutable record for all actions and activities of that cooperative society. The registration of members and computing devices those members will use to interact with the cooperative society are stored in the blockchain, where a blockchain node is used to collect all proposals and votes on those proposals. The proposals are stored in the blockchain, as well as results of votes, and, in some instances, the votes themselves may be stored in the blockchain, which creates an immutable, and thus indisputable, record of all proposals and voting in the group. Smart contracts and other mechanisms can be used to ensure that proposals are carried out, such as through the automatic transfer of funds, initiation of purchases, etc. By using a blockchain for all records, the ability for a member to embezzle funds, mismanage the group, leave early, withhold their deposit, or otherwise act at the detriment of the group, can be removed. Additionally, by using a blockchain, members can participate through a computing device for all actions, which eliminates the need to meet physically, which can reduce the expenditure of the group or members for meetings, save time, and enable groups to be established over significantly longer distances and time zones, which can expand the reach of such societies. Thus, the use of a blockchain to implement a cooperative society can result in significant improvements over existing systems.

A method for implementing a cooperative society through a blockchain with participation via computing devices includes: storing, in a memory of a blockchain node, a blockchain, the blockchain being comprised of a plurality of blocks, each block including at least a block header and one or more blockchain data values, where at least one of the one or more blockchain data values included in a specific block includes proposal data including at least a proposal identifier; receiving, by a receiver of the blockchain node, a vote message from each of a plurality of registered computing devices, where the vote message includes at least the proposal identifier and an affirmative or negative vote; determining, by a processor of the blockchain node, a proposal result based on a number of affirmative votes in the received vote messages being above a predetermined threshold; generating, by the processor of the blockchain node, a new block, the new block including at least a new block header and at least one new blockchain data value, the at least one new blockchain data value including the proposal result; and performing, by the processor of the blockchain node, one or more actions based on data included in the proposal data.

A system for implementing a cooperative society through a blockchain with participation via computing devices includes: a plurality of registered computing devices; and a blockchain node including a memory storing a blockchain, the blockchain being comprised of a plurality of blocks, each block including at least a block header and one or more blockchain data values, where at least one of the one or more blockchain data values included in a specific block includes proposal data including at least a proposal identifier, a receiver receiving a vote message from each of the plurality of registered computing devices, where the vote message includes at least the proposal identifier and an affirmative or negative vote, and a processor determining a proposal result based on a number of affirmative votes in the received vote messages being above a predetermined threshold, generating a new block, the new block including at least a new block header and at least one new blockchain data value, the at least one new blockchain data value including the proposal result, and performing one or more actions based on data included in the proposal data.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

Glossary of Terms

Blockchain-A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Implementing a Cooperative Society Through Blockchain

Figure 1:
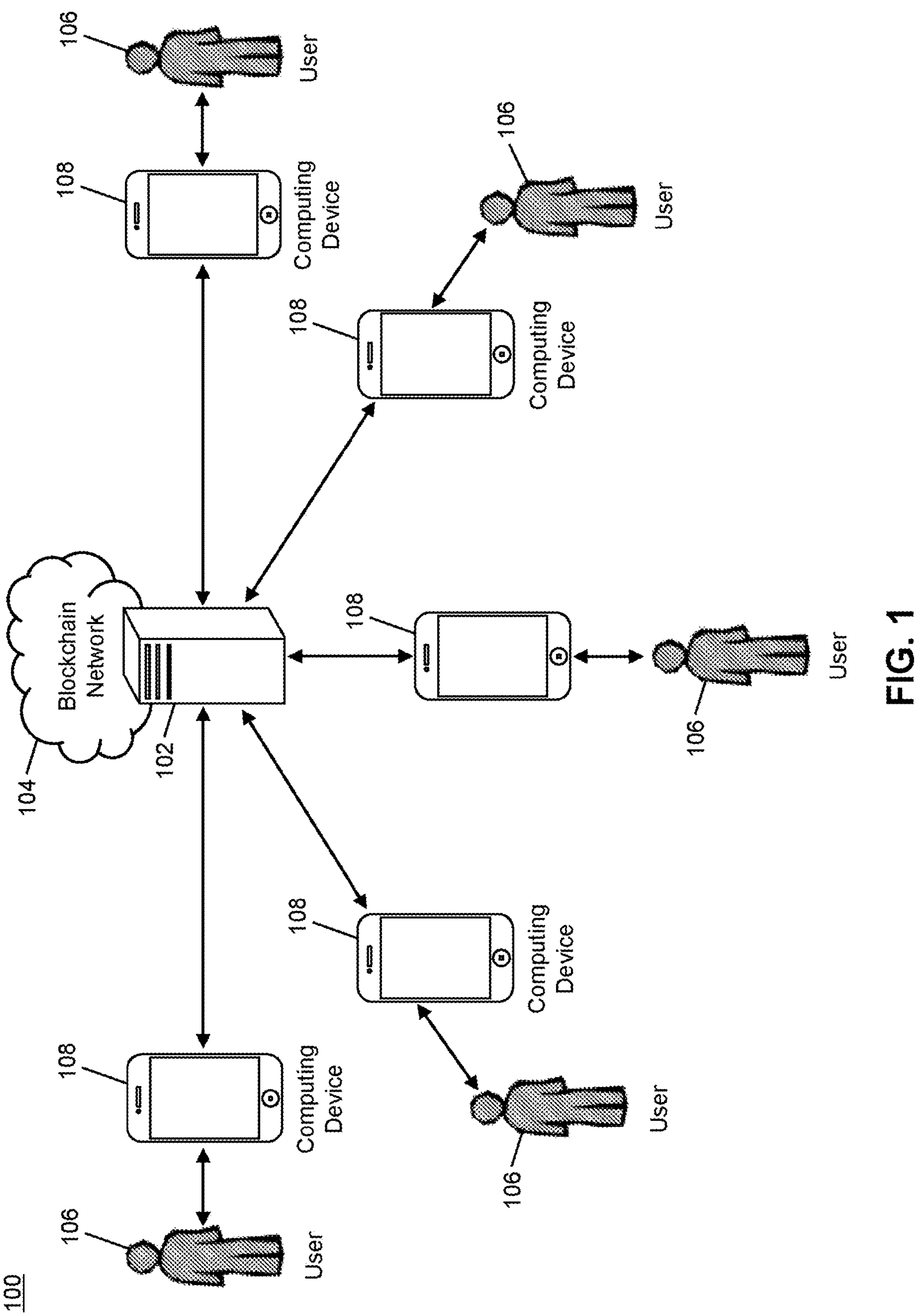
FIG. 1 is a block diagram illustrating a high-level system architecture for implementing a cooperative society through a blockchain in accordance with exemplary embodiments.

FIG. 1 illustrates a system 100 for the implementation of a cooperative society, through a blockchain with participation via member computing devices.

Figure 2:
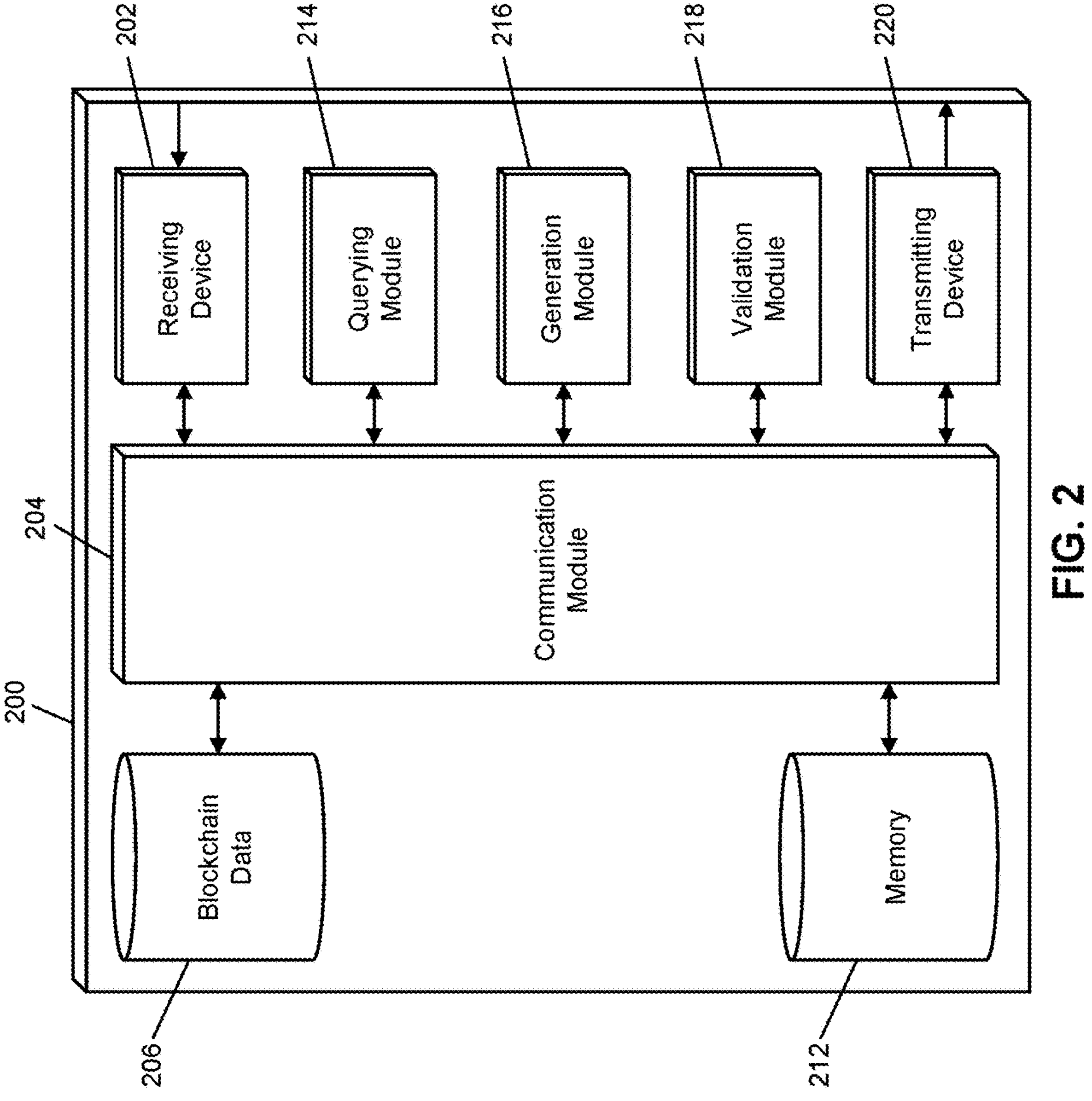
FIG. 2 is a block diagram illustrating a blockchain node of the system of FIG. 1 for the implementation of a cooperative society in accordance with exemplary embodiments.
Figure 5:
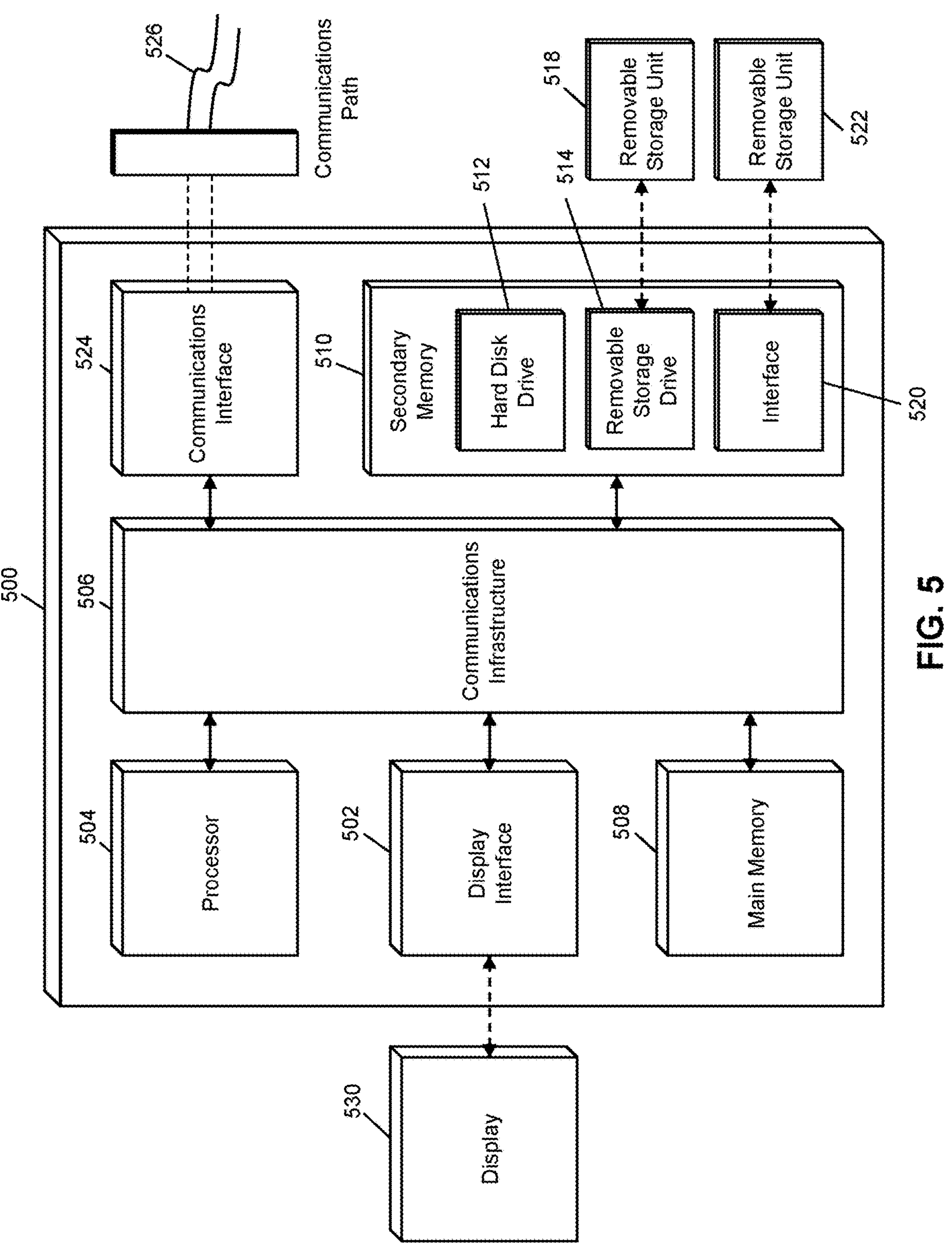
FIG. 5 is a block diagram illustrating a computer system architecture in accordance with exemplary embodiments.

The system 100 may include one or more blockchain nodes 102. Each blockchain node 102 may be part of a blockchain network 104. Each blockchain node 102 may be a computing system, such as illustrated in FIGS. 2 and 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 102 in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device (e.g., computing devices 108) that stores the private key for use thereof in blockchain transactions. For instance, each computing device may each have their own private key for respective cryptographic key pairs and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., a computing device 108) that is generated using the sender's private key, a blockchain address of the recipient of currency (e.g., another computing device 108) generated using the recipient's public key, and a blockchain currency amount that is transferred or other data being stored. In the case of the blockchain being used for data storage separate from currency, the currency amount may be replaced by such other data, as discussed below with respect to cooperative societies. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 102 in the blockchain network 104, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes in the blockchain network 104 before being added to the blockchain and distributed to all of the blockchain nodes 102 in the blockchain network 104 in traditional blockchain implementations. In cases where a blockchain data value may not be related to a blockchain transaction, but instead the storage of other types of data, blockchain data values may still include or otherwise involve the validation of a digital signature.

In the system 100, the blockchain may be used to store data for the operation and management of a cooperative society. The cooperative society may be any informal or formal group of users such as, but not limited to, a micro-savings group, a Chama, a Rotating Savings and Credit Association (ROSCA), an Accumulating Savings and Credit Association (ASCA), a Savings and Credit Cooperative (SACCO), and an agricultural cooperative, etc. The cooperative society may be made up of a plurality of different users 106, also referred to as members, where the society may be made of as little as two members or as many as desired by the society, such as dozens or hundreds or thousands. Each user 106 may have a computing device 108 associated therewith that the user 106 may use to perform functions related to the operation and management of the cooperative society. In some cases, the computing device 108 may be unique to the user 106 such that no user 106 may use multiple computing devices 108 or no computing device 108 may be used by multiple users 106. In other cases, each user 106 may be directly associated with a specific blockchain wallet (e.g., private key of a cryptographic key pair) which may be used for all interactions with the user 106, where the private key may move across computing devices 108 or where one computing device 108 may have private keys for multiple users 106.

In the system 100, data necessary for the management and operation of the cooperative society may be stored in the blockchain, such as an initial agreement, membership data, proposals, votes on proposals, actions performed by the cooperative society, land purchases, deposits, payouts, etc. In some embodiments, when the cooperative society is formed, initial rules and registration may be stored in the genesis block or in early blocks of the blockchain, where any blockchain node 102 may ensure compliance with those rules for any new blocks or actions to be performed associated therewith. In some cases, the initial rules may consist of starting users 106 for the cooperative society, where any rules or other data may be added only upon acceptance by the users 106. In some instances, the initial rules may require majority acceptance, unanimous acceptance, or some other threshold as may be decided by the users 106, which may, in some cases, be saved in configuration data in the blockchain nodes 102 or in the blockchain itself.

In some cases, registration data for users 106 may be stored in the blockchain itself. For instance, blockchain data values may include a public key for each user 106 that is a member of the cooperative society, where the public key can be used to validate digital signatures generated using a user's private key, to validate interactions being with a genuine, registered member of the cooperative society. In other cases, the registration data (e.g., a public key) may be stored in the blockchain nodes 102 themselves. In one example, the genesis block or first new block added to the blockchain may include the public keys for each of the founding members of the cooperative society.

When a user 106 wants to make a proposal for the cooperative society, they may submit a proposal to a blockchain node 102 using their computing device 108. The proposal may be digitally signed using their private key, such that the blockchain node 102 may be able to validate the digital signature using the corresponding public key stored in the blockchain or other data storage. In some instances, a unique identifier, such as a registration number, may be used to identify the public key to be used for the validation. If the validation of the digital signature is unsuccessful, then the blockchain node 102 may ignore the proposal, as the failed validation may indicate that the submission is not from a registered member. In cases where membership may have levels, only some users 106 may have permission to make new proposals. In such cases, the blockchain node 102 may only accept the proposal upon successful validation of the digital signature and checking permissions associated with that user 106 (e.g., stored in the blockchain itself or with the public key in other data storage).

When a proposal is accepted by the blockchain node 102 as being submitted by a registered, authorized user 106, then the proposal may be added to the blockchain. The proposal may be included as a new blockchain data value that is included in a new block generated by the blockchain node 102 and confirmed and added to the blockchain using traditional methods and systems. In some cases, the blockchain network 104 may be comprised of only a single blockchain node 102, where the blockchain node 102 may provide its own confirmation. In some instances, the blockchain may be a private blockchain such that only authorized blockchain nodes 102 and computing devices 108 may access or view blockchain data, such that the registered users 106 may be able to validate the blocks and data therein, but where the data may not be publicly available. In some cases, proposal data may include information regarding the user 106 that submitted the proposal, or any other data that may be necessary for users 106 to vote on the proposal, restrictions regarding voting on the proposal (e.g., which users 106 are allowed to vote, vote threshold requirements for passing the proposal, etc.), or actions to be performed as a result of the proposal, such as discussed in more detail below.

Once the proposal has been added to the blockchain, other users 106 may be able to vote on the proposal. In some embodiments, blockchain nodes 102 may electronically transmit notifications to users 106 via associated computing devices 108, which may notify the user 106 that a new proposal has been submitted, which may include proposal data or otherwise provide information suitable for the user 106 to be able to view the proposal for making their vote. The notification may be transmitted using any suitable method, such as via an e-mail, push notification in an application program, short message service message, multimedia message service message, etc. For example, a user 106 may receive a push notification in an application program on the computing device 108 used for the cooperative society informing the user 106 of the new proposal, where the user 106 may interact with the application program to view data on the proposal and make their vote.

When the user 106 is ready to make their vote, they may interact with their computing device 108 to vote on the proposal, such as by casting a vote in the affirmative or in the negative for the proposal. The vote may be input by the user 106 on the computing device 108 using any suitable method. The vote may be digitally signed by the user's private key, which may enable the blockchain node 102 to validate that the vote came from a registered and authorized user 106, and to ensure that there are no duplicate votes or votes counted from unauthorized people or devices. The computing device 108 may then submit the digitally signed vote to a blockchain node 102.

The blockchain node 102 may receive the digitally signed vote and may validate the digital signature, such as using the methods discussed above. The blockchain node 102 may make a tally of all of the votes received from the registered users 106. In some cases, the blockchain nodes 102 may wait until a vote has been received from every registered user 106 that is authorized to vote on the proposal. In other cases, there may be criteria for ending a period of time after which the votes may be counted, even if not every potentially authorized user 106 has submitted a vote. For instance, the proposal may be submitted with a time deadline, a minimum number of votes, a percentage of votes, or other suitable criteria. Once voting is closed for any of the above reasons, the blockchain node 102 may count the affirmative votes and negative votes.

If the number of affirmative votes meets a predetermined threshold, then the proposal may be approved. The predetermined threshold may be set in the blockchain itself or in the configuration data for the blockchain nodes 102. In some cases, each proposal may have its own assigned predetermined threshold, which may be included in the proposal data for the proposal. For example, a cooperative society may require majority approval for some types of proposals, such as user deposits or withdrawals of funds, but may require supermajority or unanimous approval for other types of proposals, such as the purchase of real estate. If the proposal does not receive the required number of affirmative votes, the proposal may fail. In such cases, the blockchain node 102 may generate a new blockchain data value to be included in a new block that is confirmed and added to the blockchain, where the new blockchain data value includes the negative result for the proposal. The negative result may include at least a unique identifier associated with the proposal, also referred to herein as a "proposal identifier," and an indication that the vote failed. In some cases, the count of the votes may be included in the blockchain data value. In some embodiments, each vote may be recorded in the blockchain, either in the same blockchain data value as the result, or where a new blockchain data value may be included for every vote that is received on a proposal, which may include the proposal identifier and the digitally signed vote, which may enable any user 106 or other interested party to independently audit each proposal and vote for the cooperative society.

If the proposal receives enough affirmative votes to meet or exceed the appropriate predetermined threshold, then the vote may be approved. A blockchain node 102 may add a new blockchain data value for the approved proposal, including the proposal identifier and the results of the vote that indicate approval. The blockchain node 102 may also perform one or more actions as a result of the proposal. The actions performed by the blockchain node 102 may be based on the proposal itself. For example, the proposal may be for the addition of a new user 106 to the cooperative society, where the performed action may be the addition of a new blockchain data value to the blockchain (e.g., in a new block that is generated by a blockchain node 102 and confirmed in the blockchain network 104) that includes the public key for the new user 106, and, in some instances, may also include the updating of any other membership data. In another example, the proposal may be for the withdrawal of society funds by a user 106. In such an instance, the blockchain node 102 may initiate a payment transaction to be made from a transaction account for the society (e.g., whose account details may be stored in the blockchain itself or otherwise available to the blockchain node 102) to the user 106, such as to a transaction account associated therewith as included in the registration data for the user 106. In yet another example, the proposal may be for the purchasing of real estate by the cooperative society, where the blockchain node 102 may initiate the purchase, such as by paying the required amount of funds from a transaction account for the cooperative society to an escrow service, electronically transmitting a contract or offer for purchase to an appropriate external device or system, etc. The actions to be performed by the blockchain node 102 may vary based on the proposals as well as the operations and goals of the cooperative society itself.

In some embodiments, the blockchain network 104 may utilize smart contracts for the performing of actions or management of the blockchain and/or cooperative society. For example, smart contracts may be executed to perform actions related to proposals, such as for the initiation of payment transactions. In another example, a proposal may include a smart contract that may be executed upon approval of the proposal, which may result in the proposal being carried out. For example, the user 106 may, via their computing device 108, generate a smart contract that would transfer a desired amount of funds to a transaction account specified by the user 106 from the cooperative society's account. In some cases, the blockchain may include smart contracts that are executed periodically, where a proposal and approval vote may be required to prevent execution of that smart contract. For example, a smart contract may be established for each registered user 106 for the collection of membership fees from each user 106 every month from a transaction account specified by the user 106 at the time of registration, where a proposal must be submitted and approved to modify the transaction account, payment amount, or period of payment.

The methods and systems discussed herein may be applicable to any type of cooperative society, regardless of membership type, operation type of the cooperative society, or goal of the cooperative society. For example, some cooperative societies are established as merry go rounds, where each user 106 contributes a specified amount of currency each month (e.g., $1,000) and where one user 106 gets the total amount of contributions (e.g., $10,000 for a cooperative society with ten users 106) each month. Smart contracts may be used to ensure that contributions or always made, to prevent a payout to a user 106 that has not contributed a predetermined number of times, to prevent a user 106 that has received a payout from withdrawing from the society, etc. Because the blockchain is immutable, the ability for a user 106 to act fraudulent about a contribution or payout, or a user 106 to embezzle contributions or operating funds, is removed as there is an immutable record of all actions and transactions for the cooperative society.

By using a blockchain, the problems faced by traditional cooperative societies can be removed entirely. For instance, because the record is immutable, there can be no embezzlement, collusion, misplacement of funds, early exits, etc. Additionally, there can be full transparency of all voting and the ability for any user 106 to fully validate every vote as well as the votes themselves, to ensure they are submitted by genuine, authorized users 106. Furthermore, because every user 106 can participate using their computing device 108, there is no need for physical meetings, which can vastly reduce the operating costs of a cooperative society or the expenses that may be necessary by users 106 to participate in a cooperative society. In addition, users 106 can vote and participate at their convenience, which can result in faster votes and higher participation rates due to the ease of participation and accommodation for all users 106. Accordingly, the methods and systems discussed herein provide for significant improvements in the operation and management of cooperative societies through the use of a blockchain and user participation through computing devices.

Blockchain Node

FIG. 2 illustrates an embodiment 200 of a blockchain node 102 in the system 100. It will be apparent to persons having skill in the relevant art that the embodiment of the blockchain node 102 illustrated in FIG. 2 is provided as illustration only and may not be exhaustive to all possible configurations of the blockchain node 102 suitable for performing the functions as discussed herein. For example, the computer system 500 illustrated in FIG. 5 and discussed in more detail below may be a suitable configuration of the blockchain node 102.

The blockchain node 102 may include a receiving device 202. The receiving device 202 may be configured to receive data over one or more networks via one or more network protocols. In some instances, the receiving device 202 may be configured to receive data from other blockchain nodes 102, computing devices 108, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 108 that may be superimposed or otherwise encoded with registration data (e.g., public keys, transaction account data, user information, device data, etc.), proposals (e.g., smart contracts, required actions, transaction account data, contracts, etc.), voting data (e.g., digitally signed votes, proposal identifiers, etc.), or other data as discussed herein. The receiving device 202 may also be configured to receive data signals electronically transmitted by other blockchain nodes 102, such as may be superimposed or otherwise encoded with blockchain data values, new blocks, confirmation messages, or other data used in the operation and management of the blockchain.

The blockchain node 102 may also include a communication module 204. The communication module 204 may be configured to transmit data between modules, engines, databases, memories, and other components of the blockchain node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 102 and external components of the blockchain node 102, such as externally connected databases, display devices, input devices, etc. The blockchain node 102 may also include a processing device. The processing device may be configured to perform the functions of the blockchain node 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The blockchain node 102 may also include blockchain data 206, which may be stored in a memory 212 of the blockchain node 102 or stored in a separate area within the blockchain node 102 or accessible thereby. The blockchain data 206 may include a blockchain, which may be comprised of a plurality of blocks and be associated with the blockchain network 104. The blockchain data 206 may also or alternatively include any data associated with one or more blockchain wallets that may be used by the blockchain node 102, such as cryptographic key pairs, unspent transaction outputs, digital asset amounts, network identifiers for the blockchain network 104, smart contracts, signature generation algorithms, encryption algorithms, transaction account data, account balances, communication information for third party services, etc.

The blockchain node 102 may also include a memory 212. The memory 212 may be configured to store data for use by the blockchain node 102 in performing the functions discussed herein, such as public and private keys, symmetric keys, etc. The memory 212 may be configured to store data using suitable data formatting methods and schema and may be any suitable type of memory, such as read-only memory, random access memory, etc. The memory 212 may include, for example, encryption keys and algorithms, communication protocols and standards, data formatting standards and protocols, program code for modules and application programs of the processing device, and other data that may be suitable for use by the blockchain node 102 in the performance of the functions disclosed herein as will be apparent to persons having skill in the relevant art. In some embodiments, the memory 212 may be comprised of or may otherwise include a relational database that utilizes structured query language for the storage, identification, modifying, updating, accessing, etc. of structured data sets stored therein. The memory 212 may be configured to store, for example, cryptographic keys, salts, nonces, communication information for blockchain nodes 102 and blockchain networks 104, address generation and validation algorithms, digital signature generation and validation algorithms, hashing algorithms for generating reference values, data for the generation and execution of smart contracts, predetermined threshold values, configuration data, etc.

The blockchain node 102 may include a querying module 214. The querying module 214 may be configured to execute queries on databases to identify information. The querying module 214 may receive one or more data values or query strings and may execute a query string based thereon on an indicated database, such as the memory 212 of the blockchain node 102 to identify information stored therein. The querying module 214 may then output the identified information to an appropriate engine or module of the blockchain node 102 as necessary. The querying module 214 may, for example, execute a query on the blockchain data 206 to identify a public key to be used to validate a digital signature on a submitted proposal or a vote submitted by a user 106 via their computing device 108.

The blockchain node 102 may also include a generation module 216. The generation module 216 may be configured to generate data for use by the blockchain node 102 in performing the functions discussed herein. The generation module 216 may receive instructions as input, may generate data based on the instructions, and may output the generated data to one or more modules of the blockchain node 102. For example, the generation module 216 may be configured to generate blockchain data values, new blocks, block headers, reference values, smart contracts, etc. The generation module 216 or other processing module of the blockchain node 102 may be further configured to perform actions, such as via the execution of smart contracts or other actions that may be necessary to be performed following the approval of a proposal.

The blockchain node 102 may also include a validation module 218. The validation module 218 may be configured to perform validations for the blockchain node 102 as part of the functions discussed herein. The validation module 218 may receive instructions as input, which may also include data to be used in performing a validation, may perform a validation as requested, and may output a result of the validation to another module or engine of the blockchain node 102. The validation module 218 may, for example, be configured to validate digital signatures using suitable signature generation algorithms and keys, validate transaction values, and other data as discussed herein. For instance, the validation module 218 may also be configured to validate account balances, compliance with rules and regulations for the cooperative society, validate that a user 106 is authorized to vote on a specific proposal, validate the results of a vote, etc.

The blockchain node 102 may also include a transmitting device 220. The transmitting device 220 may be configured to transmit data over one or more networks via one or more network protocols. In some instances, the transmitting device 220 may be configured to transmit data to other blockchain nodes 102, computing devices 108, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

Figure 3:
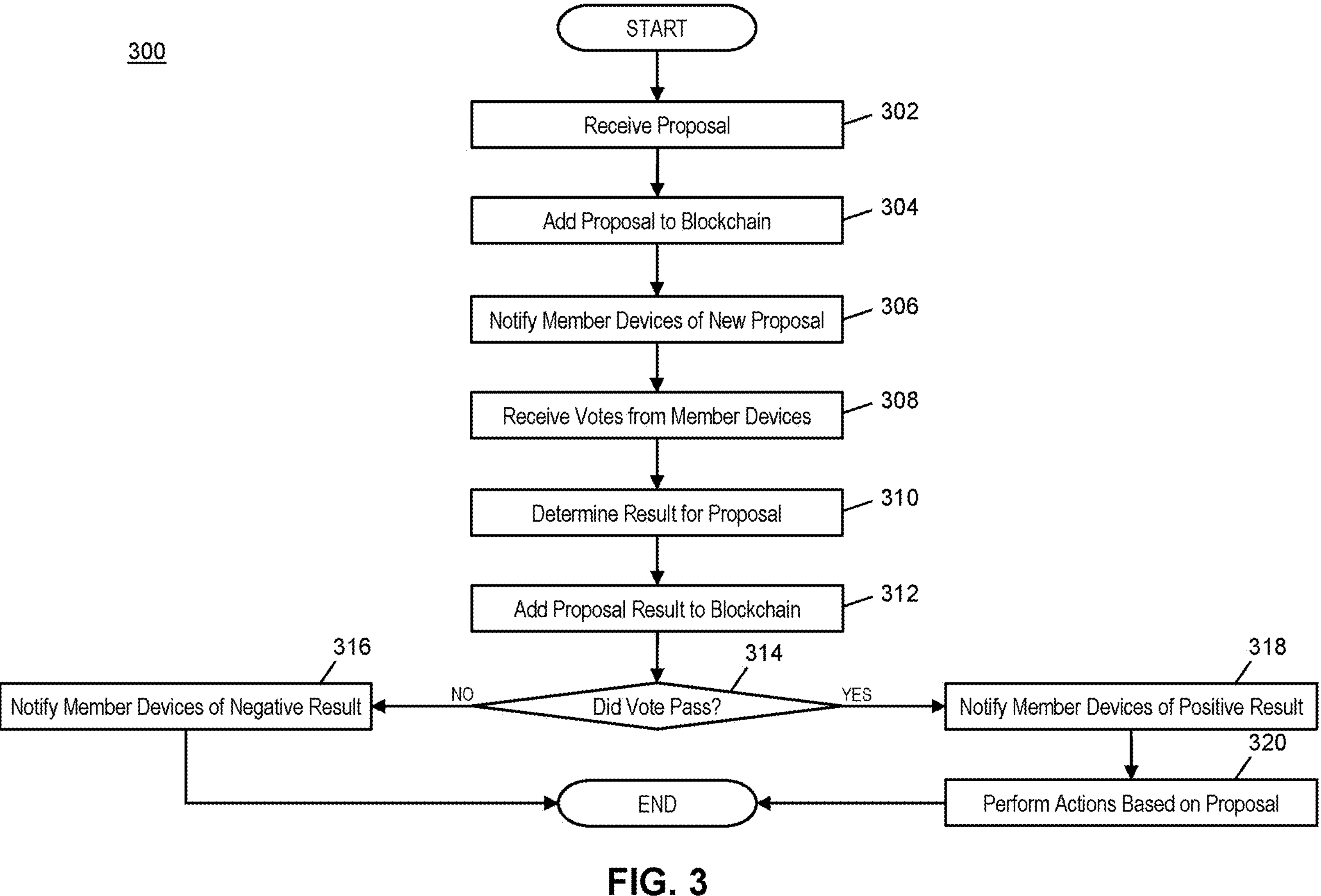
FIG. 3 is a flow diagram illustrating a process for implementing a cooperative society through a blockchain in accordance with exemplary embodiments.

The transmitting device 220 may be configured to electronically transmit data signals to computing devices 108, such as may be superimposed or otherwise encoded with requests for registration data, proposal notifications, voting results, other data requests, operating information for the cooperative society, etc. The transmitting device 220 may also be configured to electronically transmit data signals to other blockchain nodes 102 that may be superimposed or otherwise encoded with blockchain data values, new blocks, confirmation messages, or other data used in the operation and management of the blockchain Process for Proposals and Voting in a Cooperative Society FIG. 3 illustrates a process 300 for the submission of and voting on a new proposal in a cooperative society implemented through a blockchain in the system 100 of FIG. 1 as discussed above.

In step 302, the receiving device 202 of a blockchain node 102 in the blockchain network 104 of the system 100 may receive a new proposal from a user 106 in the cooperative society via a computing device 108, which may be submitted using any suitable communication network and method. For example, the cooperative society may have an application program that the user 106 may execute on their computing device 108 for generating a new proposal, digitally signing the proposal, and submitting the proposal to the blockchain node 102. The proposal may include any data that may be useful for the users 106 in the cooperative society for voting (e.g., names, pictures, titles, descriptions, geographic locations, etc.) as well as information regarding one or more actions to be performed if the proposal is approved. In some cases, the proposal data may also include data regarding which users 106 are authorized to vote on the proposal and the predetermined threshold for finding approval of the proposal.

In step 304, the generation module 216 of the blockchain node 102 may assign a proposal identifier to the received proposal, generate a new blockchain data value that includes the proposal identifier and other proposal data, generate a new block that includes the new blockchain data value, and have the new block confirmed (e.g., by other blockchain nodes 102 in the blockchain network 104 using traditional methods and systems). In step 306, the transmitting device 220 of the blockchain node 102 may electronically transmit a notification message to each of the computing devices 108 of registered users 106 (e.g., or only those registered users 106 eligible to vote for the proposal, as applicable). The notification message may include at least the proposal identifier, or any other proposal data. Each user 106 may then view the proposal on their computing device 108, such as by the computing device 108 retrieving the new blockchain data value in the new block from the blockchain and presenting the proposal data to the user 106 via the cooperative society's application program.

Each user 106 may select a vote for the proposal (e.g., affirmative or negative, or from any other available options, such as may be specified in the proposal data), the vote may be digitally signed using a private key in the computing device 108, and the vote may be submitted to the blockchain node 102, where, in step 308, the receiving device 202 of the blockchain node 102 may receive digitally signed votes from each of the computing devices 108. In step 310, the blockchain node 102 may determine the result for the proposal based on the votes. In some cases, the validation module 218 of the blockchain node 102 may first validate each of the received votes, such as by validating the digital signature on a vote using the public key of the cryptographic key pair for which the private key was used to generate the signature, as well as validating that the user 106 that submitted the vote (e.g., identified via the public key) is authorized to vote for that proposal, such as based on the proposal data. The validation module 218 may determine if the vote is approved or fails based on a number of affirmative votes and the predetermined threshold, which may specify a percentage of affirmative votes, number of affirmative votes, etc.

In step 312, the generation module 216 of the blockchain node 102 may generate a new blockchain data value that includes the result of the proposal (e.g., the proposal identifier, if the vote was approved or failed, the number of votes, etc.) and may generate a new block that includes the new blockchain data value and a block header including required reference values. The new block may be transmitted to other blockchain nodes 102 in the blockchain network 104 as applicable, which may be confirmed and added to the blockchain. In step 314, the blockchain node 102 may determine if the vote passed (e.g., was approved). If the vote did not pass, then, in step 316, the transmitting device 220 of the blockchain node 102 may electronically transmit a notification message to the computing devices 108 of the users 106 in the cooperative society, notifying the users 106 of the failed vote. In some instances, the notification message may only be sent to users 106 that submitted a vote. In other instances, the notification message may be sent to users 106 authorized to vote on the proposal.

If, in step 314, the blockchain node 102 determines that the vote passed, then, in step 318, the transmitting device 220 of the blockchain node 102 may electronically transmit a notification message to the computing devices 108 of the users 106 in the cooperative society, notifying the users 106 of the approved proposal. In step 320, the blockchain node 102 may perform one or more actions based on the proposal data, such as to fulfill the proposal. For example, the transmitting device 220 of the blockchain node 102 may transmit a contract or offer to a real estate firm, the blockchain node 102 may initiate a payment transaction, the blockchain node 102 may generate a new blockchain data value that includes registration data for a new user 106, data indicating a user 106 is no longer part of the society, or for changing registration data for an existing user 106, etc.

Exemplary Method for Implementing a Cooperative Society Through Blockchain

Figure 4:
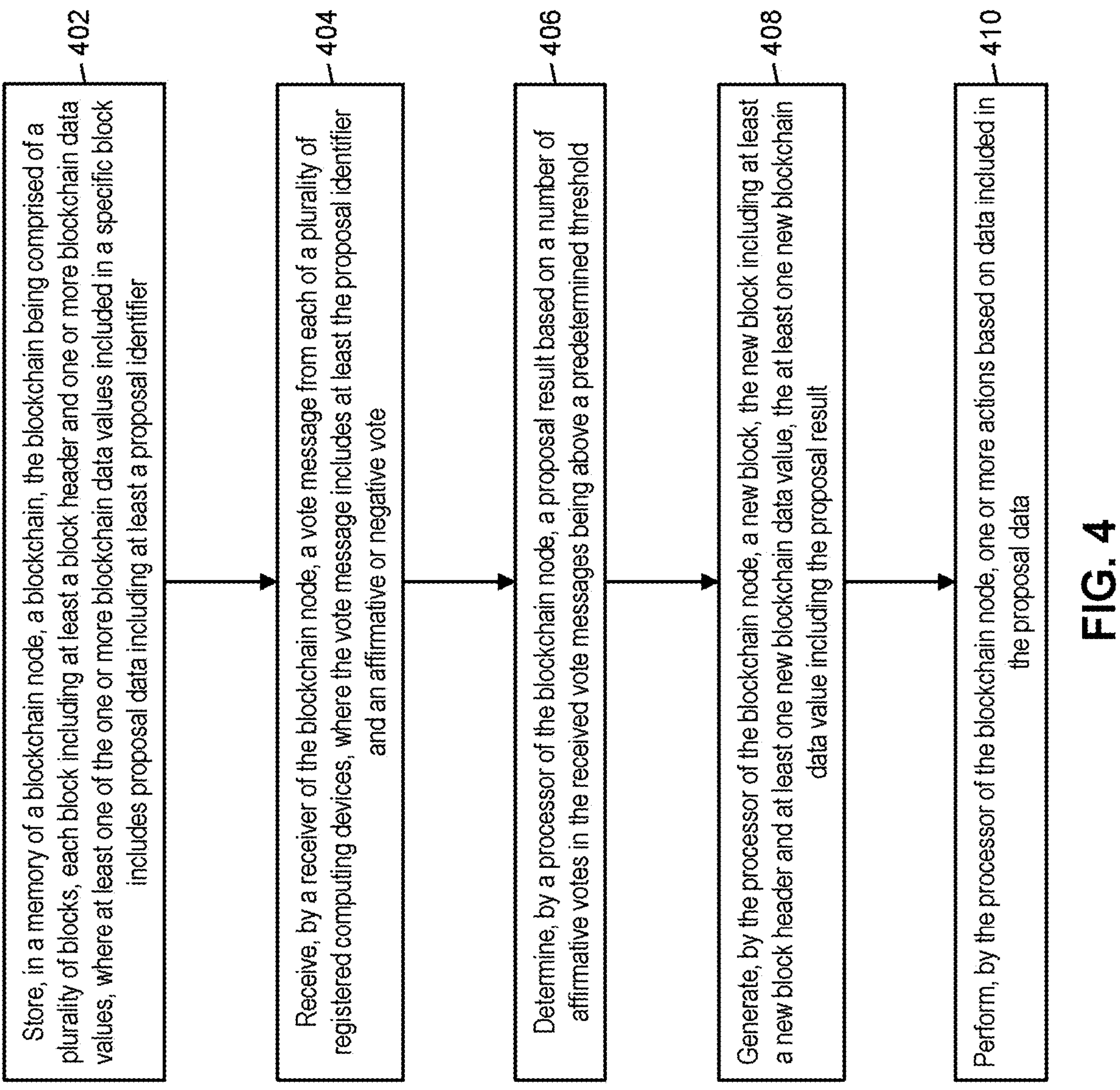
FIG. 4 is a flow chart illustrating an exemplary method for implementing a cooperative society through a blockchain with participation via computing devices in accordance with exemplary embodiments.

FIG. 4 illustrates a method 400 for implementing a cooperative society through a blockchain with participation via computing devices for proposals and votes involving the cooperative society and users thereof.

In step 402, a blockchain may be stored in a memory (e.g., blockchain data 206, memory 212, etc.) of a blockchain node (e.g., blockchain node 102), the blockchain being comprised of a plurality of blocks, each block including at least a block header and one or more blockchain data values, where at least one of the one or more blockchain data values included in a specific block includes proposal data including at least a proposal identifier. In step 404, a vote message may be received by a receiver (e.g., receiving device 202) of the blockchain node from each of a plurality of registered computing devices (e.g., computing devices 108), where the vote message includes at least the proposal identifier and an affirmative or negative vote.

In step 406, a proposal result may be determined by a processor (e.g., generation module 216, validation module 218, etc.) of the blockchain node based on a number of affirmative votes in the received vote messages being above a predetermined threshold. In step 408, a new block may be generated by the processor (e.g., generation module 216) of the blockchain node, the new block including at least a new block header and at least one new blockchain data value, the at least one new blockchain data value including the proposal result. In step 410, one or more actions may be performed by the processor of the blockchain node based on data included in the proposal data.

In one embodiment, the one or more of the one or more blockchain data values included in the plurality of blocks may include registration data for each of the plurality of registered computing devices. In a further embodiment, the registration data may include a device identifier, and the vote message received from each of the plurality of registered computing devices may include a device identifier included in the registration data for the registered computing device. In some embodiments, the method 400 may further include validating, for each received vote message, the registered computing device the respective vote message is received from by the processor of the blockchain node, wherein the proposal result is further based on received vote messages with positive validations for the registered computing device the respective vote message is received from.

In one embodiment, the predetermined threshold may be a number of negative votes in the received vote messages that include the proposal identifier. In some embodiments, the predetermined threshold may be at least half of a number of computing devices in the plurality of registered computing devices. In one embodiment, the proposal data may include the predetermined threshold. In some embodiments, the one or more actions may include at least one of: initiating an electronic payment transaction, initiating a blockchain transaction, transmitting a predetermined data message to a predetermined destination, and registering a new computing device.

Computer System Architecture

FIG. 5 illustrates a computer system 500 in which embodiments of the present disclosure, or portions thereof, may be implemented as computer-readable code. For example, the blockchain node 102 of FIGS. 1 and 2 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above-described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general-purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower-level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower-level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for implementing a cooperative society through a blockchain with participation via computing devices. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for implementing a cooperative society through a blockchain with participation via computing devices, comprising:

storing, in a memory of a blockchain node, a blockchain, the blockchain being comprised of a plurality of blocks, each block including at least a block header and one or more blockchain data values, where at least one of the one or more blockchain data values included in a specific block includes proposal data including at least a proposal identifier;

receiving, by a receiver of the blockchain node, a vote message from each of a plurality of registered computing devices, where the vote message includes at least the proposal identifier and an affirmative or negative vote;

determining, by a processor of the blockchain node, a proposal result based on a number of affirmative votes in the received vote messages being above a predetermined threshold;

generating, by the processor of the blockchain node, a new block, the new block including at least a new block header and at least one new blockchain data value, the at least one new blockchain data value including the proposal result; and performing, by the processor of the blockchain node, one or more actions based on data included in the proposal data.

2. The method of claim 1, wherein the one or more of the one or more blockchain data values included in the plurality of blocks includes registration data for each of the plurality of registered computing devices.

3. The method of claim 2, wherein the registration data includes a device identifier, and the vote message received from each of the plurality of registered computing devices includes a device identifier included in the registration data for the registered computing device.

4. The method of claim 1, wherein the predetermined threshold is a number of negative votes in the received vote messages that include the proposal identifier.

5. The method of claim 1, wherein the predetermined threshold is at least half of a number of computing devices in the plurality of registered computing devices.

6. The method of claim 1, wherein the proposal data includes the predetermined threshold.

7. The method of claim 1, wherein the one or more actions includes at least one of: initiating an electronic payment transactions, initiating a blockchain transaction, transmitting a predetermined data message to a predetermined destination, and registering a new computing device.

8. The method of claim 1, further comprising:

validating, for each received vote message, the registered computing device the respective vote message is received from by the processor of the blockchain node, wherein the proposal result is further based on received vote messages with positive validations for the registered computing device the respective vote message is received from.

9. A system for implementing a cooperative society through a blockchain with participation via computing devices, comprising:

a plurality of registered computing devices; and a blockchain node including a memory storing a blockchain, the blockchain being comprised of a plurality of blocks, each block including at least a block header and one or more blockchain data values, where at least one of the one or more blockchain data values included in a specific block includes proposal data including at least a proposal identifier, a receiver receiving a vote message from each of the plurality of registered computing devices, where the vote message includes at least the proposal identifier and an affirmative or negative vote, and a processor determining a proposal result based on a number of affirmative votes in the received vote messages being above a predetermined threshold, generating a new block, the new block including at least a new block header and at least one new blockchain data value, the at least one new blockchain data value including the proposal result, and performing one or more actions based on data included in the proposal data.

10. The system of claim 9, wherein the one or more of the one or more blockchain data values included in the plurality of blocks includes registration data for each of the plurality of registered computing devices.

11. The system of claim 10, wherein the registration data includes a device identifier, and the vote message received from each of the plurality of registered computing devices includes a device identifier included in the registration data for the registered computing device.

12. The system of claim 9, wherein the predetermined threshold is a number of negative votes in the received vote messages that include the proposal identifier.

13. The system of claim 9, wherein the predetermined threshold is at least half of a number of computing devices in the plurality of registered computing devices.

14. The system of claim 9, wherein the proposal data includes the predetermined threshold.

15. The system of claim 9, wherein the one or more actions includes at least one of: initiating an electronic payment transactions, initiating a blockchain transaction, transmitting a predetermined data message to a predetermined destination, and registering a new computing device.

16. The system of claim 9, wherein the process of the blockchain node further validates the registered computing device the respective vote message is received from by the processor of the blockchain node, and the proposal result is further based on received vote messages with positive validations for the registered computing device the respective vote message is received from.

17. The method of claim 1, wherein the one or more actions is an addition of a new user to the cooperative society, and wherein the performing one or more actions based on data included in the proposal data includes:

generating, by the processor of the blockchain node, a new block that includes a public key for a new user.

18. The method of claim 1, wherein the one or more actions is a withdrawal of funds from the cooperative society by a user, and wherein the performing one or more actions based on data included in the proposal data includes:

initiating, by the processor of the blockchain node, a payment transaction for the withdrawal of funds from a transaction account for the cooperative society to a transaction account associated with the user.

19. The method of claim 1, wherein the one or more actions is a purchase of real estate by the cooperative society, and wherein the performing one or more actions based on data included in the proposal data includes:

initiating, by the processor of the blockchain node, a payment transaction for the withdrawal of funds from a transaction account for the cooperative society to an escrow service.

* * * * *